(12) United States Patent
Chojnacki (10) Patent No.: US 6,991,092 B2
(45) Date of Patent: Jan. 31, 2006

(54) BELT CONVEYOR FOR TRANSPORTING TOBACCO MATERIALS

(75) Inventor: Jerzy W. Chojnacki, Radom (PL)

(73) Assignee: International Tobacco Machinery Poland Ltd., Radom (PL)

( * ) Notice: Subject to any disclaimer, the term of this patent is extended or adjusted under 35 U.S.C. 154(b) by 0 days.

(21) Appl. No.: 10/508,811

(22) PCT Filed: Jan. 31, 2003

(86) PCT No.: PCT/PL03/00008

§ 371 (c)(1),
(2), (4) Date: Jan. 19, 2005

(87) PCT Pub. No.: WO03/086114

PCT Pub. Date: Oct. 23, 2003

(65) Prior Publication Data

US 2005/0167247 A1 Aug. 4, 2005

(30) Foreign Application Priority Data

Apr. 12, 2002 (PL) .................................... 353387

(51) Int. Cl.
*B65G 27/20* (2006.01)
(52) U.S. Cl. ...................... 198/779; 198/766
(58) Field of Classification Search ............. 198/750.8, 198/766, 770, 774.3; 131/108, 109.1, 109.3
See application file for complete search history.

(56) References Cited

U.S. PATENT DOCUMENTS

| 1,992,361 | A | * | 2/1935 | Diescher | .................. 198/774.3 |
| 2,239,858 | A | | 4/1941 | Randolph | |
| 4,616,663 | A | | 10/1986 | Lorenzen et al. | |
| 5,762,176 | A | * | 6/1998 | Patterson et al. | ........... 198/770 |
| 6,269,940 | B1 | * | 8/2001 | Rosenstrom | ................ 198/753 |
| 6,276,518 | B1 | * | 8/2001 | Wierman | ................. 198/752.1 |
| 6,851,548 | B1 | * | 2/2005 | Dumbaugh | ................. 198/770 |

* cited by examiner

Primary Examiner—James R. Bidwell
(74) Attorney, Agent, or Firm—Darby & Darby (57) ABSTRACT

An apparatus for transporting loose tobacco material includes a transporting belt, equipped with a vibratory sub-assembly with independent driving elements and a feeding channel placed over the transporting belt. The vibratory sub-assembly has the form of at least two separate vibratory portions, each having at least one roller with eccentric elements and symmetrically arranged counter-weights. Each of the vibratory portions has separate adjusting elements to provide independent adjustment of the magnitude and direction of vibration amplitude vector, and also has separate adjusting elements providing independent adjustment of the frequency of the transporting belt vibrations, independently of speed of the transporting belt. An additional belt conveyor having vibratory portions is mounted over the transporting belt.

5 Claims, 6 Drawing Sheets

BELT CONVEYOR FOR TRANSPORTING TOBACCO MATERIALS

FIELD OF THE INVENTION

The invention relates to a belt conveyor for transporting tobacco materials.

BACKGROUND OF THE INVENTION

Flat belt conveyor with one vibratory portion (a roller) is known from U.S. Pat. No. 5,641,055, the vibratory portion serving to distribute the transported material uniformly across the transporting belt of the conveyor (along its width). The vibratory portion has a separate, independent drive. The vibratory roller is symmetrically, drum-like shaped, narrowing towards its ends, thereby the maximum amplitude of deflection is achieved in the middle of the transporting belt and decreases from the center towards both walls. Speed of the belt is synchronized with rotational speed, i.e., frequency of strikes against the belt so as to avoid multiple striking against the same portion of the transported material. Such a conveyor does not meet a function of compacting.

From U.S. Pat. No. 4,703,846 a trough belt conveyor is known, in which side rolls positioned at an angle relative to the horizontal direction are formed so as to cause vibrations of the transported material through the transporting belt, additionally to decreasing friction against the side walls of the conveyor as a result of rolling friction, such that particles of the material agglomerate in a created trough making impossible or minimizing relative mechanical interaction between immobile parties. This conveyor does not meet a function of compacting either.

From U.S. Pat. No. 4,911,827 a flat belt conveyor for cleaning grain/seed is known with a vibratory portion.

BRIEF DESCRIPTION OF THE INVENTION

The purpose of the invention is to provide a belt conveyor for transportation of an organic material such as plants, herbs and particularly tobacco on a transporting belt, being fed continuously and uniformly across all the width of the transporting belt at its feeding portion with simultaneous compaction of the material during transportation, i.e., increasing density of the transported material between the feeding point under a feeding channel and a discharge point from the conveyor.

The belt conveyor according to the invention illustratively for transporting loose tobacco material, has a transporting belt equipped with a vibratory sub-assembly with a separate driving device and a feeding channel placed over the belt, with the vibratory sub-assembly of the transporting belt having a form of at least two separate vibratory portions, each of them having at least one roller provided with eccentric elements and symmetrically arranged counterweights, and in case of using eccentric elements of the same active radii on the rollers of all the vibratory portions, the distance between the transporting belt and axes of the rollers of the starting vibratory portion in which feeding of the comminuted tobacco material takes place, is minimal, the distance from the transporting belt to axes of the rollers of successive vibratory portions is an increasing function, and when axes of the rollers of all the vibratory portions are at the same distance from the transporting belt then the active radius of the eccentric elements of the starting vibratory portion is the largest and the radius decreases for the eccentric elements of the rollers of successive vibratory portions, and ech of the vibratory portions has separate adjusting elements providing independent adjustment of magnitude and direction of the vibration amplitude vector, and has also separate adjusting elements providing independent adjustment of frequency of the transporting belt vibrations, irrespective of speed of the transporting belt.

Each vibratory portion is preferably equipped with separate adjusting elements providing adjustment of a distance and inclination of each vibratory portion relative to the transporting belt, rollers of each of the vibratory portions being connected through belt pulleys with separate driving arrangements, separate relative to the driving assembly driving the transporting belt, the driving arrangements of vibratory portions are equipped with adjusting elements providing adjustment of rotational speed of motors being part of these driving arrangements.

Preferably, an additional belt conveyor having vibratory portions is mounted over the transporting belt.

Preferably, a pressure plate having vibratory portions is swingingly mounted over the transporting belt.

Preferably, a stationary or rotary scraper bucket is mounted over the transporting belt, and includes adjusting elements for adjusting the height of the scraper bucket relative to the transporting belt surface and adjusting the scraping bucket position relative to the transporting belt surface along the horizontal axis extending along the direction of the transporting belt movement.

BRIEF DESCRIPTION OF THE DRAWINGS

Embodiments of the invention are presented with reference to accompanying drawings, in which:

FIG. 7 shows an example of a swingingly mounted pressure plate.

DETAILED DESCRIPTION OF THE INVENTION

Figure 1:
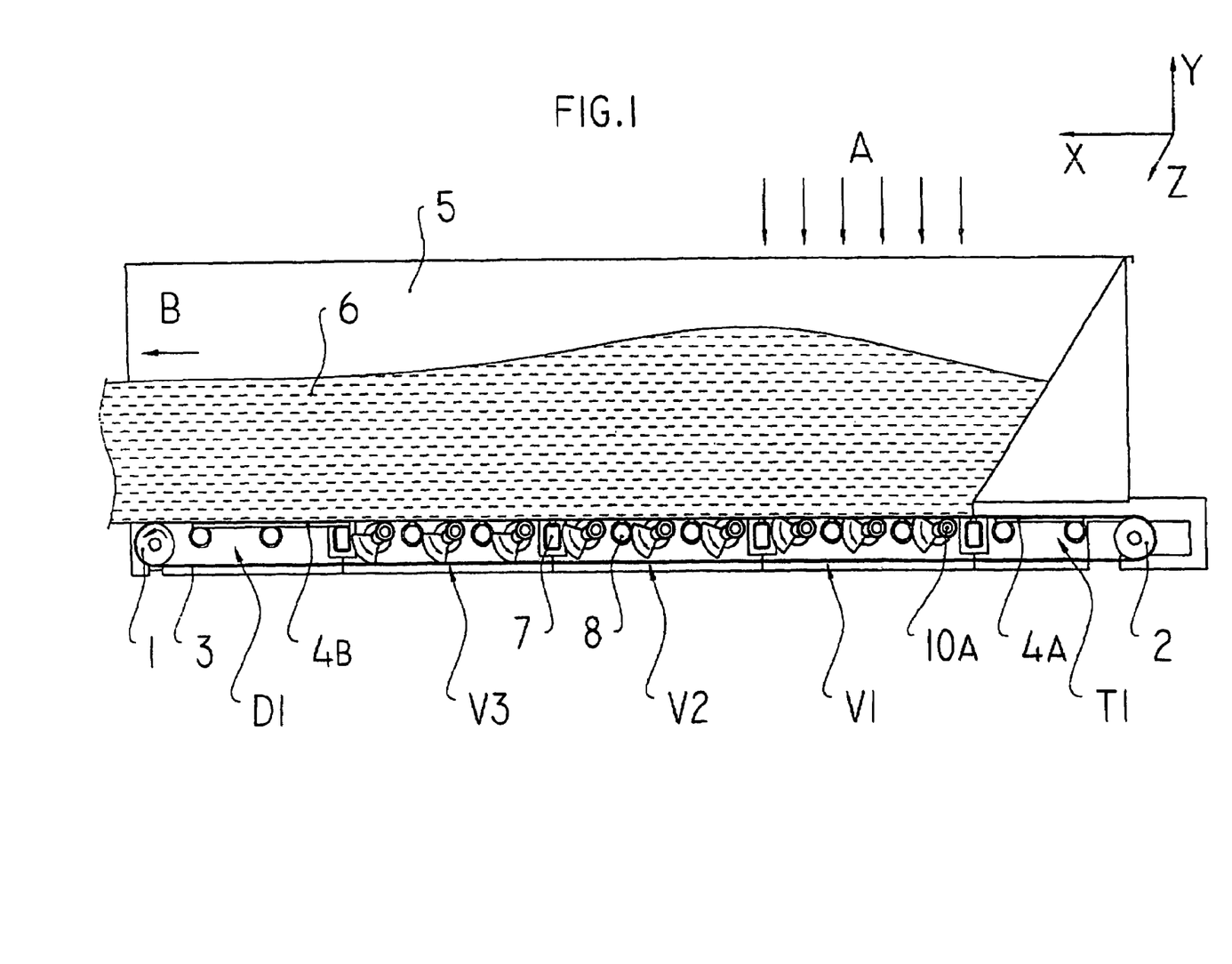
FIG. 1 is a side view of a belt conveyor according to the invention.

A belt conveyor according to the invention illustratively shown in FIG. 1 compacting comminuted/loose tobacco material has tension roller 2 placed in a tensioning portion T1, and a driving roller 1 placed in a driving portion D1 with a mounted thereto external drive (not shown), a load-bearing structure in form of a vibratory sub-assembly, and a transporting belt 3, transporting a material fed in portion A. The surface of the transporting belt may be smooth or may be profiled, depending on technological requirements.

The vibratory sub-assembly has the form of three separate vibratory portions V1, V2, V3, each of them having three rollers 10A equipped with eccentric elements 10B and symmetrically arranged counterweights 10C. In the case of using identical eccentric elements 10B on rollers 10A of all vibratory portions V1, V2, V3, the distance between the transporting belt 3 and the axis of the rollers 10A of the first vibration portion V1, corresponding to a starting portion, in which feeding of the loose tobacco material takes place, is minimal. The distances from the transporting belt 3 to the axes of rollers 10A of the successive vibratory portions V2, V3 are increasing functions, and when axes of rollers 10A of all vibratory portions V1, V2, V3 are at the same distance from the transporting belt 3 then the active radius of eccentric elements 10B of the first vibratory portion V1 is biggest and the radius decreases for eccentric elements 10B of rollers 10A of successive vibratory portions V2, V3.

Each of the vibratory portions V1, V2, V3 has separate adjusting elements formed by rollers 10A and providing independent adjustment of intensity and direction of a vector of the vibration amplitude, and has also separate adjusting elements formed by eccentric elements 10B and providing independent adjustment of frequency of the transporting belt 3 oscillations, irrespective of the belt transporting rate.

The adjusting elements adjust the distance and, optionally, inclination of each vibratory portion V1, V2, V3 relative to transporting belt 3, while rollers 10a of each vibratory portion V1, V2, V3 are connected through pulleys 11 with separate driving arrangements, the driving arrangements being separate relative to the driving arrangement which drives the transporting belt 3, driving arrangements (not shown) of the vibratory portions V1, V2, V3 are equipped with adjusting elements adjusting rotation rate of motors forming part of these driving arrangements.

The distances between the driving rollers 10A of a vibratory portion can be independently adjusted so that amplitude of pre-selected, desired value is applied where necessary to maximize impact force transmitted from each roller's eccentrics 10B through the transporting belt 3 to the stream of tobacco 6. Independently of that, revolutions of the rollers 10A within each of the vibratory portions V1, V2, V3 are adjusted by setting revolutions of the driving motor and/or transmission ratio to each vibratory portion. In this way, the frequency of the roller's rotation is adjusted. By having the mutually independent means of setting positions where both amplitude and frequency are transmitted from the rollers through the transmission belt 3 to the conveyed product. e.g., loose tobacco, specifically advantageous acceleration can be applied to the stream of the conveyed product to orient loose particles of the conveyed product and thus compact the product efficiently and uniformly.

Figure 5:
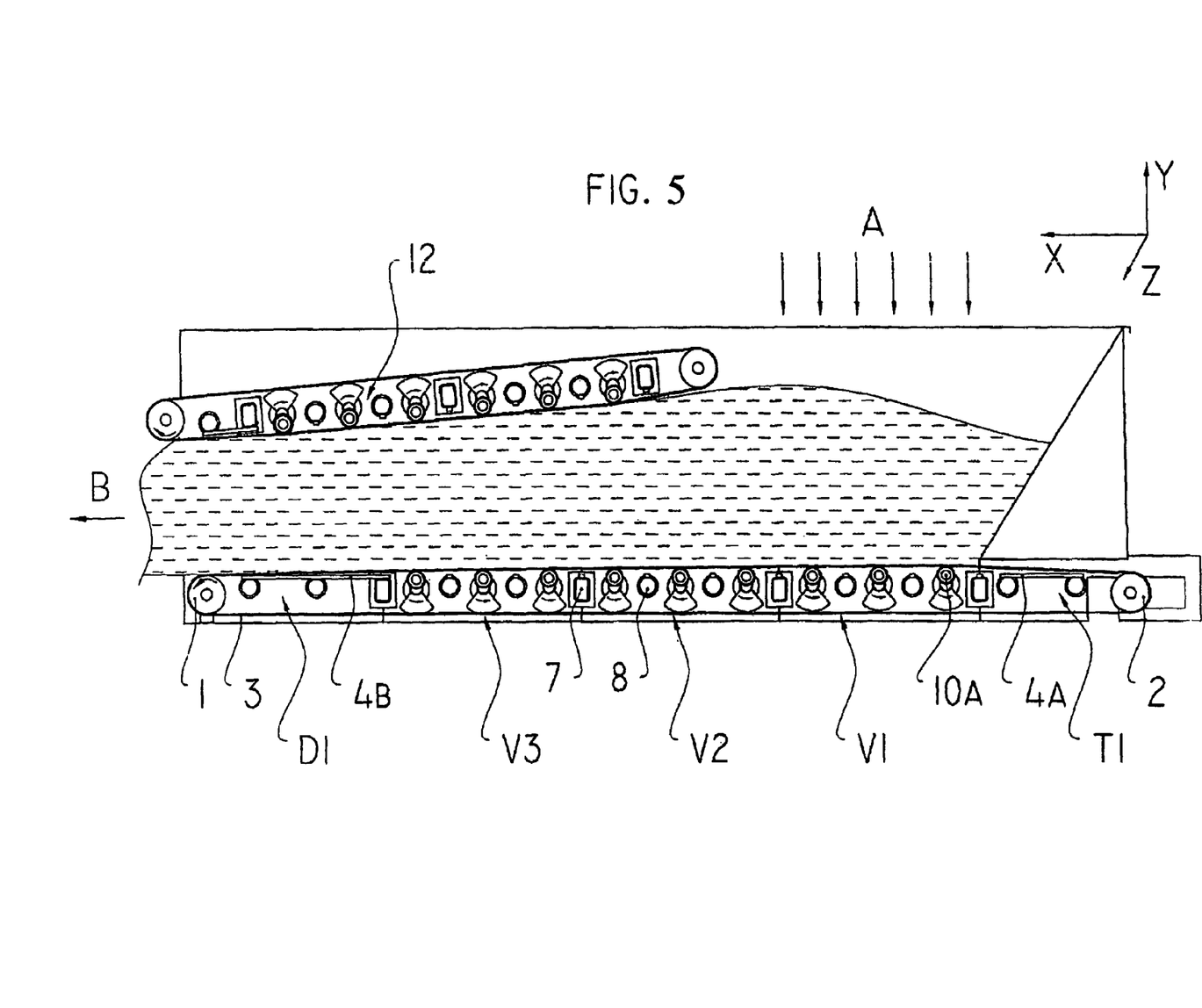
FIG. 5 illustrates a second embodiment of the belt conveyor according to the invention, comprising an additional belt conveyor with vibratory portions.

An additional belt conveyor 12 is fastened to the side walls 5 over the transporting belt 3, the belt conveyor 12 comprising vibratory portions as shown in FIG. 5 or a pressure plate 14 (FIG. 7) comprising vibratory portions is mounted swingingly on pins protruding from the side walls 5 over the transporting belt 3.

Figure 6:
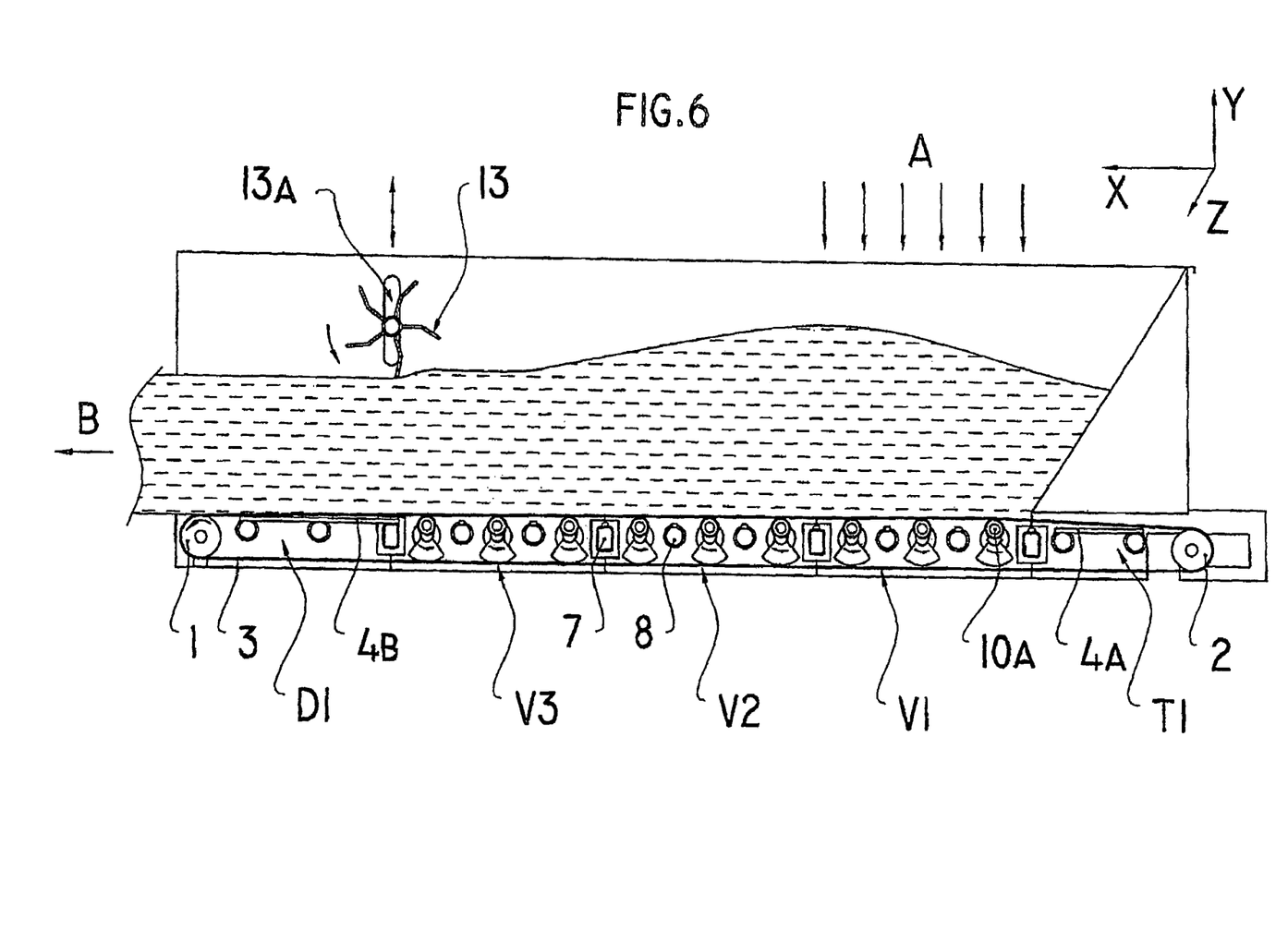
FIG. 6 shows a third embodiment of the belt conveyor according to the invention, comprising a scraper bucket.

As shown in FIG. 6, a stationary or rotary scraper bucket 13 may be attached to the side walls 5 over the ending portion of the transporting belt 3, the scraper bucket 13 being equipped with adjusting elements for adjusting the height of the scraper bucket 13 relative to the surface of the transporting belt 3 and for adjusting the position of the scraper bucket 13 along the horizontal axis X extending along the movement direction of the transporting belt 3.

As mentioned above, the conveyor according to the invention may have a plurality of mechanical vibratory portions V1 . . . Vn. In an exemplary embodiment shown in FIG. 2 there are only three vibratory portions V1, V2, V3 placed under the upper surface of the transporting belt 3, which generate transversely directed vibrations, preferably perpendicularly to the direction of the belt movement (transport). According to the invention, characteristic feature of the conveyor is that both amplitude as well as frequency of vibrations of each vibratory portion are chosen, adjusted, and controlled irrespective of motion parameters of the transporting belt 3, including its linear speed.

Figure 2:
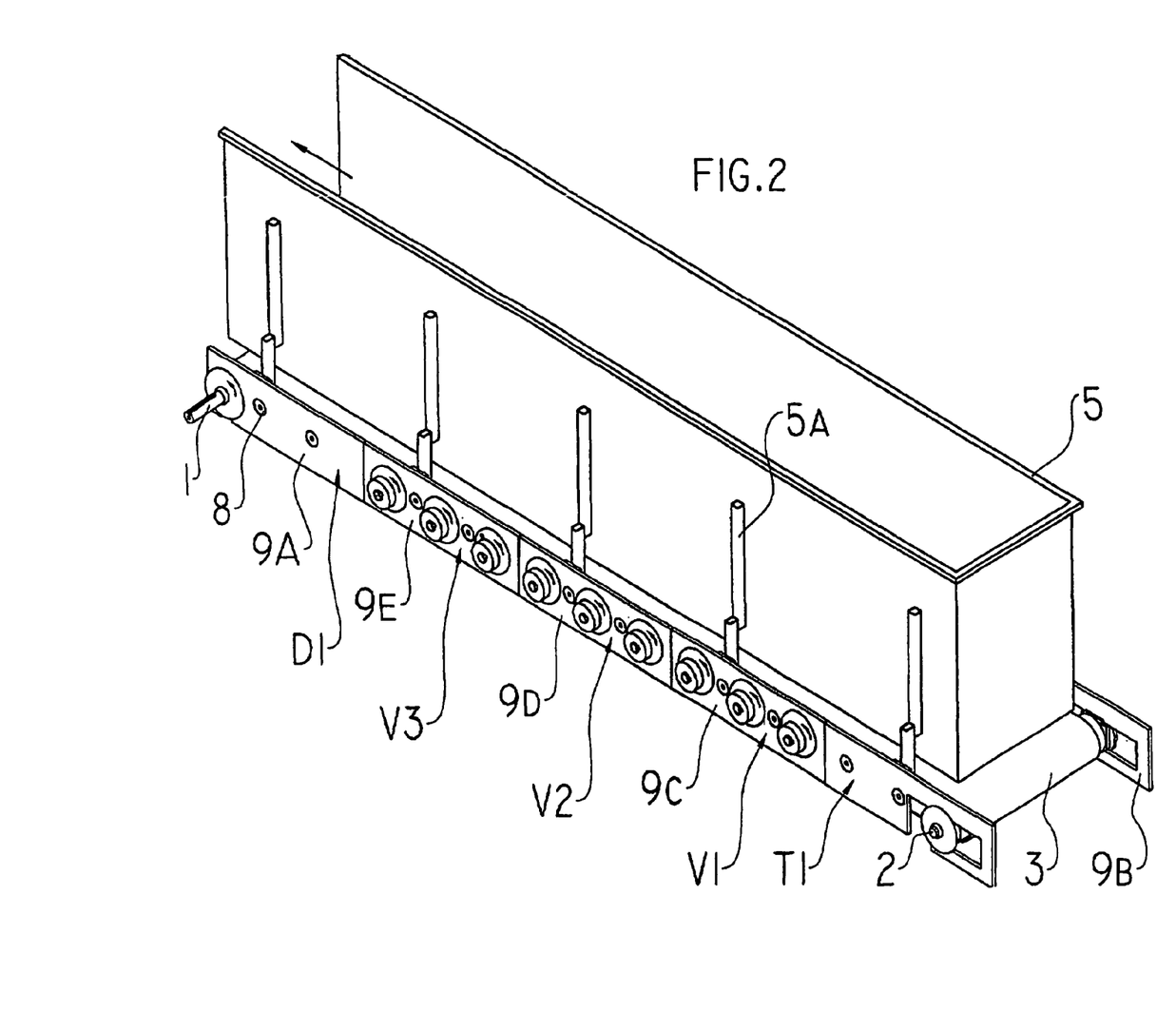
FIG. 2 is a perspective view of a belt conveyor according to the invention.

Rotation of eccentric rollers 10a in each vibratory portion V1, V2, V3 is synchronized via pulleys 11 with a toothed belt, not shown in the drawing. It means that the rotation of the rollers 10a, the rotation generating an amplitude of vibrations, is synchronized in each portion and may be controlled for example by a separate driving arrangement with a separate motor, irrespectively of motion parameters of the transporting belt 3. Such a solution allows for full control of vibratory movement of each roller 10a and in each of the vibratory portions V1, V2, V3 irrespectively of controlling all motion parameters of the transporting belt 3.

The upper profile of the transporting belt 3 may be chosen and adjusted according to the technological process requirements by suitable regulation and/or applying some elements generating vibrations of required profile. For zero amplitude of the vibrations the upper surface of the transporting belt 3 may be inclined at a slight angle relative to the horizontal direction, however it may be positioned horizontally, as in the presented solution.

Side walls 5 are placed on both sides of the belt conveyor shown in FIG. 1, the side walls profiling stream of the transported material and precluding spillage of the material outside the conveyor. FIG. 2 presents how the side walls 5 are positioned relative to the belt conveyor. In the proposed solution shown in FIG. 2, the profiling side walls 5 are fastened to the supporting frame 9a–9e by means of brackets 5a.

Figure 3:
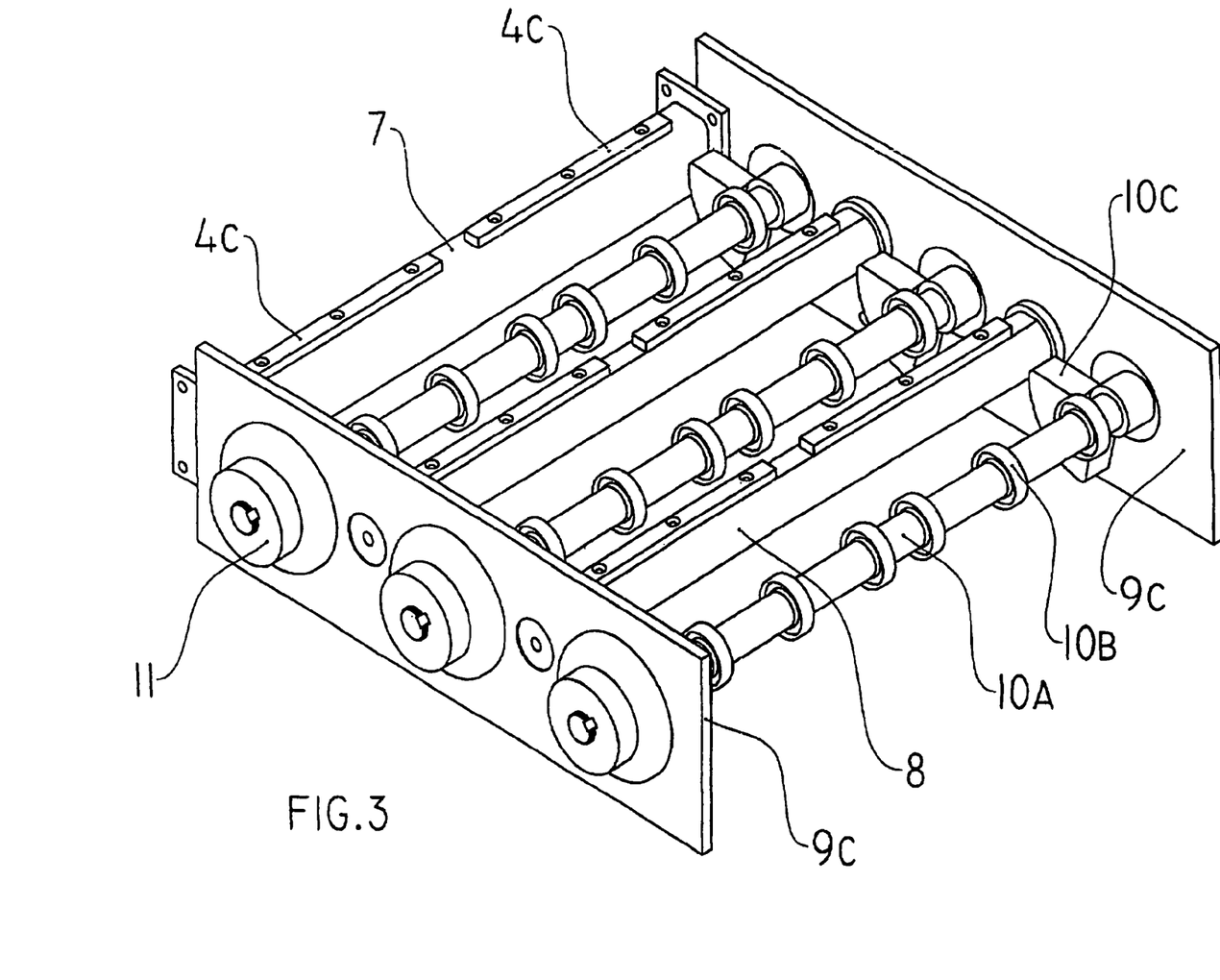
FIG. 3 shows a single vibratory portion of the belt conveyor according to the invention.

The belt conveyor according to the invention has a various, optimal for a given process, number of vibratory portions V1 . . . Vn and/or a number of kinds thereof, the vibratory portions generating vibrations of the transporting belt 3. Three identical vibratory portions V1, V2, V3 occur in the presented embodiment, as shown in FIG. 2. FIG. 3 shows a view of a single module of a vibratory portion. In the presented solution supporting frame 9a–9e of the vibratory sub-assembly comprising vibratory portions form supporting side plates 9c with transverse stiffeners 7, 8 which serve also as supports for moving transporting belt 3. In order to reduce motion resistance of the transporting belt 3, low-friction liners 4c are attached to the upper surfaces of the stiffeners 7, 8. Because of operational reasons, the low-friction liners applied in the tensioning portion T1 and the driving portion D1 have form of plates 4a and 4b, as shown in FIG. 1.

Rollers 10a are installed in the supporting frame 9a–9e, eccentric elements 10b and symmetrically arranged counterweights 10c being assembled with the rollers 10a, the eccentric elements generating desired vibrations of the transporting belt 3. Mounting the rollers 10a in bearings arranged in the supporting frame 9a–9e allows them to rotate as a result of which vibrations of the transporting belt 3 are generated, the belt being tossed up by rotating eccentric elements 10b. Position of each vibratory portion V1, V2, and V3 relatively to the transporting belt 3 is adjusted by means of adjusting elements such that direction and magnitude of a vector of maximal vibration amplitude can be set according to a decreasing function, optimal for a given process. Thus a position of any vibratory portion V1, V2, and V3 may be changed along the axis X-Y-Z (FIG. 1) and, moreover, each of the vibratory portions V1, V2, V3 may be inclined at an angle relative to the transporting belt 3.

All the vibratory portions have separate driving means. In the proposed solution choosing and controlling of amplitude and frequency of vibration along the transporting belt 3 is achieved, irrespective of speed of the given transporting belt 3. Preferably, each vibratory portion V1, V2, V3 has its own, separate driving arrangement. It is also possible that the transporting belt 3 as well as individual vibratory portions V1, V2, and V3 are driven by a single motor through transmission gear arrangements.

Moreover, amplitude and frequency of vibrations in each of the vibratory portions V1, V2, V3 may be adjusted and controlled within a given range, irrespective of values set in other portions. According to the invention the amplitude of vibrations of the transporting belt 3 of the conveyor is biggest in the starting portion of the conveyor, in which feeding of the material takes place, and is a characteristic function for a given process, and decreases in successive portions, i.e., amplitude of the first vibratory portion V1 is maximal whereas amplitude of the last vibratory portion V3 is minimal for a given series of vibratory portions, this being a result of employing the smallest distance between the first vibratory portion V1 and the transporting belt 3 and the longest distance between the third vibratory portion V3 and the transporting belt 3 when identical eccentric elements 10b are used or else employing a maximal active radius of eccentric elements 10b in the first vibratory portion V1 and a minimal active radius of eccentric elements 10b in the third vibratory portion V3 when identical distance of axes of the rollers 10a of all the vibratory portions V1, V2, V3 from the transporting belt 3. Thus a desired compaction of the transported tobacco is achieved, prior to discharge from the conveyor.

Figure 4:
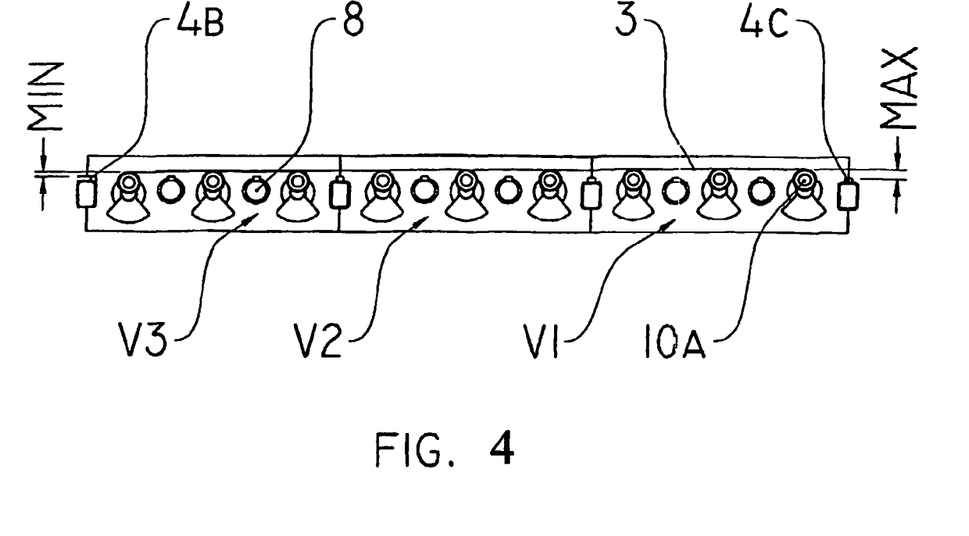
FIG. 4 is a side view of three successive vibratory portions of the belt conveyor according to the invention.

FIG. 4 shows an arrangement of eccentric elements and distribution of vibration amplitude of the transporting belt 3 surface where the maximal vibration amplitude of the upper surface of the transporting belt 3 is achieved in the portion V1 while the minimal in portion V3.

An additional effect achieved by applying the above mentioned innovations is advantageous polarization of particles of the transported tobacco material. The tobacco material particles are chaotically distributed in the feeding zone A while in consequence of vibratory treatment during transportation on the conveyor according to the invention the particles leave the conveyor in the discharge zone B in such a manner that they tend to minimize free space therebetween and take the position, being optimally parallel each to other.

In order to form a predetermined shape of the stream of the transported material and to avoid spilling out the processed material, side walls 5 in form of a forming/sealing channel are placed adjacently along the length of the transporting belt 3, preferably beyond the transporting belt 3, as shown in FIG. 1.

The side walls 5 extend from the tension roller 2 at least to the driving roller 1, with a possibility of extending beyond the tension roller 2, in order to allow for correct, continuous transfer of the formed and compacted material stream to a successive machine and to avoid any disturbance of the stream of the tobacco particles at the discharge point.

Furthermore, it is possible to attach above the material being transferred on the belt 3 an additional belt conveyor 12 with vibratory portions, mounted within the side walls 5, as shown in FIG. 5. The purpose of this additional upper belt conveyor 12 is to intensify and/or facilitate compaction of the transported material. The purpose may be also to intensify and/or facilitate a uniform or any desired distribution of the transported material across the transporting belt 3. The upper belt conveyor 12 may be replaced by a pressure plate 14 having vibratory portions arms 14a swingingly mounted (FIG. 7) on pins protruding from the side walls 5 and means of applying additional pressure 14B. The purpose of the plate 14 is vibratory pressing down the transported material thereby compacting or facilitating compaction and/or distributing the material transported on the transporting belt 3.

FIG. 7 shows an example of a swingingly mounted pressure plate 14 where the plate is hung above the tobacco stream and its suspension point 14A is positioned and fixed to the conveyor's side walls above the transporting belt 3. Compressing action of the pressure plate can be controlled by adjusting an independently controlled force that can be applied dynamically by e.g. a pneumatic servo-motor 14B and/or adjusting dead-weight of the plate 14.

Furthermore, it has turned out to be advantageous to provide the belt conveyor according to the invention with a stationary or rotary scraper bucket 13, as shown in FIG. 6, placed in the ending portion of the transporting belt 3. The scraper bucket 13 may be installed on the side walls 5, irrespective of the additional belt conveyor 12 or the pressure plate 14. The scraper bucket 13 is equipped with adjusting elements 13A (FIG. 6) for adjusting its height relative to the belt surface and for adjusting its position along the horizontal axis X. Employing the scraper 13 makes it possible to obtain a constant level of the transported material at the output of the conveyor, irrespective of—fluctuations of feeding the material onto the conveyor.

What is claimed is:

1. A belt conveyor for transporting loose tobacco materials, comprising:
   a transporting belt, equipped with a vibratory sub-assembly with independent driving means,
   a feeding channel placed over the transporting belt, wherein
   the vibratory sub-assembly of the transporting belt (3) comprises at least two separate vibratory portions (V1, V2, V3), each comprising at least one roller (10a) having eccentric elements (10b) and symmetrically arranged counterweights (10c), wherein
   in case of using eccentric elements (10b) of the same active radii on the rollers (10a) of all the vibratory portions (V1, V2, V3), the distance between the transporting belt (3) and the axes of the rollers (10a) of the starting vibratory portion in which feeding of the loose tobacco material takes place is minimal, and the distance from the transporting belt (3) to the axes of the rollers (10a) of successive vibratory portions (V2, V3) is an increasing function, and wherein
   when the axes of the rollers (10a) of all the vibratory portions (V1, V2, V3) are at the same distance from the transporting belt (3) then the active radius of the eccentric elements (10b) of the starting vibratory portion (V1) is the largest, and the radius decreases for the eccentric elements (10b) of the rollers (10a) of successive vibratory portions (V2, V3), and
   wherein the roller (10a) of each of the vibratory portions (V1, V2, V3) is adjustable to provide independent adjustment of magnitude and direction of a vibration amplitude vector, and the eccentric elements (10b) provide independent adjustment of frequency of the transporting belt vibrations, irrespective of speed of the transporting belt (3).

2. A belt conveyor according to claim 1 wherein each of the vibratory portions (V1, V2, V3) is equipped with separate adjusting elements providing adjustment of distance and inclination of each of the vibratory portions (V1, V2, V3) relatively to the transporting belt (3), and the rollers (10a) of each vibratory portion (V1, V2, V3) are connected by pulleys (11) with separate driving arrangements, separate relative to the driving arrangement which drives the transporting belt (3), the driving arrangements of the vibratory portions (V1, V2, V3) are equipped with adjusting elements providing adjustment of rotational speed of motors forming a part of these driving arrangements.

3. A belt conveyor according to claim 1 or 2 further comprising an additional belt conveyor (12) including vibratory portions mounted over the transporting belt (3).

4. A belt conveyor according to claim 1 or 2 further comprising a pressure plate 14 having vibratory portions (14A, 14B) mounted swingingly over the transporting belt (3).

5. A belt conveyor according to claim 1 or 2 further comprising a stationary or rotary scraper bucket (13) mounted over the ending portion of the transporting belt (3), equipped with at least one adjusting element (13A) providing adjustment of the height of the scraper bucket (13) relative to the surface of the transporting belt (3) and adjustment of the position of the scraper bucket (13) relative to the surface of the transporting belt (3) along the horizontal axis (X) extending along the direction of the transporting belt (3) movement.

* * * * *